US012686385B2

(12) United States Patent
Hiraiwa et al.

(10) Patent No.: US 12,686,385 B2
(45) Date of Patent: Jul. 21, 2026

(54) VEHICLE CONTROL DEVICE, VEHICLE CONTROL METHOD, AND STORAGE MEDIUM

(71) Applicant: TOYOTA JIDOSHA KABUSHIKI KAISHA, Toyota (JP)

(72) Inventors: Yuta Hiraiwa, Miyoshi (JP); Naoki Iguchi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 6 days.

(21) Appl. No.: 18/941,610

(22) Filed: Nov. 8, 2024

(65) Prior Publication Data

US 2025/0263070 A1 Aug. 21, 2025

(30) Foreign Application Priority Data

Feb. 20, 2024 (JP) ................................. 2024-023340

(51) Int. Cl.
*B60W 30/09* (2012.01)
*B60W 30/095* (2012.01)
(Continued)

(52) U.S. Cl.
CPC ........ *B60W 30/09* (2013.01); *B60W 30/0956* (2013.01); *B60W 50/14* (2013.01);
(Continued)

(58) Field of Classification Search
CPC ............... B60W 30/09; B60W 30/095; B60W 2520/06; B60W 2554/00; G05D 1/021;
(Continued)

(56) References Cited

U.S. PATENT DOCUMENTS

| | | | |
|---|---|---|---|
| 9,105,190 B2 | 8/2015 | Akiyama | |
| 9,393,960 B2 | 7/2016 | Kodaira | |
| (Continued) | | | |

FOREIGN PATENT DOCUMENTS

| | | |
|---|---|---|
| JP | 2007-072632 A | 3/2007 |
| JP | 2019-148908 A | 9/2019 |
| (Continued) | | |

*Primary Examiner* — Erin M Piateski
*Assistant Examiner* — John C Merino
(74) *Attorney, Agent, or Firm* — SoraIP, Inc.

(57) ABSTRACT

The vehicle control device perceives an object when an object located in front of the host vehicle satisfies a predetermined perception condition, and performs either or both of the following operations: giving a warning to notify an occupant of the host vehicle of a risk of collision with the perceived object, and performing vehicle control for controlling a traveling state of the host vehicle to reduce a risk of collision when a relationship between the host vehicle and the perceived object satisfies a predetermined collision condition. The vehicle control device makes the perception condition easier to be satisfied than the case where the specific condition is not satisfied, when the specific condition including at least the condition that the restricted section in which traffic is restricted exists in front of the host vehicle in the adjacent lane adjacent to the own lane in which the host vehicle travels is satisfied.

3 Claims, 6 Drawing Sheets

(51) Int. Cl.
  *B60W 50/14*       (2020.01)
  *G06V 20/58*       (2022.01)

(52) U.S. Cl.
  CPC ....... *G06V 20/58* (2022.01); *B60W 2050/143* (2013.01); *B60W 2050/146* (2013.01); *B60W 2420/403* (2013.01); *B60W 2420/50* (2013.01); *B60W 2420/54* (2013.01); *B60W 2554/802* (2020.02)

(58) Field of Classification Search
  CPC .......... G05D 1/0223; G05D 1/65; G05D 1/24; G05D 1/0257; G05D 1/693; G05D 1/0289
  See application file for complete search history.

(56)            References Cited

U.S. PATENT DOCUMENTS

| | | | |
|---|---|---|---|
| 9,483,945 | B2 | 11/2016 | Okita et al. |
| 9,873,412 | B2 | 1/2018 | Moriizumi |
| 10,793,147 | B2 | 10/2020 | Kaminade et al. |
| 2019/0243371 | A1* | 8/2019 | Nister ................. B60W 30/095 |
| 2019/0329778 | A1* | 10/2019 | D'sa ...................... G06V 20/56 |
| 2021/0061309 | A1 | 3/2021 | Kawanai |
| 2021/0107521 | A1 | 4/2021 | Fujita et al. |
| 2021/0107528 | A1 | 4/2021 | Fujita et al. |
| 2021/0146956 | A1 | 5/2021 | Fujita et al. |
| 2021/0146958 | A1 | 5/2021 | Tanaka et al. |

FOREIGN PATENT DOCUMENTS

| | | |
|---|---|---|
| JP | 2020-170278 A | 10/2020 |
| WO | 2007/029089 A1 | 3/2007 |

\* cited by examiner

VEHICLE CONTROL DEVICE, VEHICLE CONTROL METHOD, AND STORAGE MEDIUM

CROSS-REFERENCE TO RELATED APPLICATION

This application claims priority to Japanese Patent Application No. 2024-023340 filed on Feb. 20, 2024, incorporated herein by reference in its entirety.

BACKGROUND

1. Technical Field

The present disclosure relates to a vehicle control device configured to: perceive an object that meets a predetermined perception condition; and perform either or both of the following operations when a relationship between a host vehicle and the perceived object meets a collision condition: giving a warning, and performing vehicle control. The present disclosure also relates to a vehicle control method in which a computer mounted on a host vehicle perceives an object that meets the perception condition, and performs either or both of the following operations when the collision condition is satisfied: giving a warning, and performing vehicle control. The present disclosure also relates to a storage medium storing a program that causes a computer mounted on a host vehicle to perceive an object that meets the perception condition, and causes the computer to perform either or both of the following operations when the collision condition is satisfied: giving a warning, and performing vehicle control.

2. Description of Related Art

Conventionally, there has been known a vehicle control device that performs either or both of the following operations when a collision condition is satisfied: giving a warning, and performing vehicle control. For example, a vehicle control device described in Japanese Unexamined Patent Application Publication No. 2020-170278 (JP 2020-170278 A) (hereinafter, referred to as the "conventional device") performs vehicle control earlier than normal against a cut-in vehicle that cuts in an own lane from an adjacent lane.

SUMMARY

A cut-in vehicle cuts in front of a host vehicle diagonally from behind the host vehicle. Therefore, the cut-in vehicle is more likely to be perceived when it gets closer to the host vehicle than a preceding vehicle and an oncoming vehicle. Accordingly, when the conventional device perceives the cut-in vehicle, it may already be past the timing to perform the vehicle control. In this case, the conventional device is unable to give a warning and/or perform the vehicle control against the cut-in vehicle at the above timing.

The present disclosure was made to address the above issue. In other words, an object of the present disclosure is to provide a vehicle control device that increases the possibility that the vehicle control device can give a warning and/or perform vehicle control against a cut-in vehicle at an appropriate timing.

A vehicle control device of the present disclosure (hereinafter also referred to as the "device of the present disclosure") perceives an object located in front of a host vehicle when the object meets a predetermined perception condition (steps 500 to 595, steps 600 to 695). When a relationship between the host vehicle and the perceived object meets a predetermined collision condition ("Yes" in step 330), the vehicle control device performs either or both of following operations: giving a warning to notify an occupant of the host vehicle of a risk of collision with the perceived object (step 335), and performing vehicle control for controlling a traveling state of the host vehicle in order to reduce the risk of collision (step 340).

The vehicle control device is configured to, when a specific condition is satisfied ("No" in step 310), make the perception condition easier to be satisfied (step 345) than when the specific condition is not satisfied ("Yes" in step 310). The specific condition includes at least a condition that a restricted section (RS) where traffic is restricted is present in front of the host vehicle in an adjacent lane (NL) located adjacent to an own lane in which the host vehicle travels.

When the specific condition is satisfied, there is an increased possibility that an adjacent vehicle traveling in the adjacent lane may cut in front of the host vehicle from diagonally behind the host vehicle due to the restricted section that is present in the adjacent lane. Such a cut-in vehicle cuts in front of the host vehicle from behind the host vehicle. Therefore, when the perception condition for the cut-in vehicle is satisfied, it may already be past the timing to give a warning and/or perform the vehicle control against the cut-in vehicle. When the specific condition is satisfied, the device of the present disclosure makes the perception condition easier to be satisfied than when the specific condition is not satisfied. Therefore, the device of the present disclosure can perceive the cut-in vehicle earlier. This can increase the possibility that the device of the present disclosure can give a warning and/or perform the vehicle control against the cut-in vehicle at the above timing.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
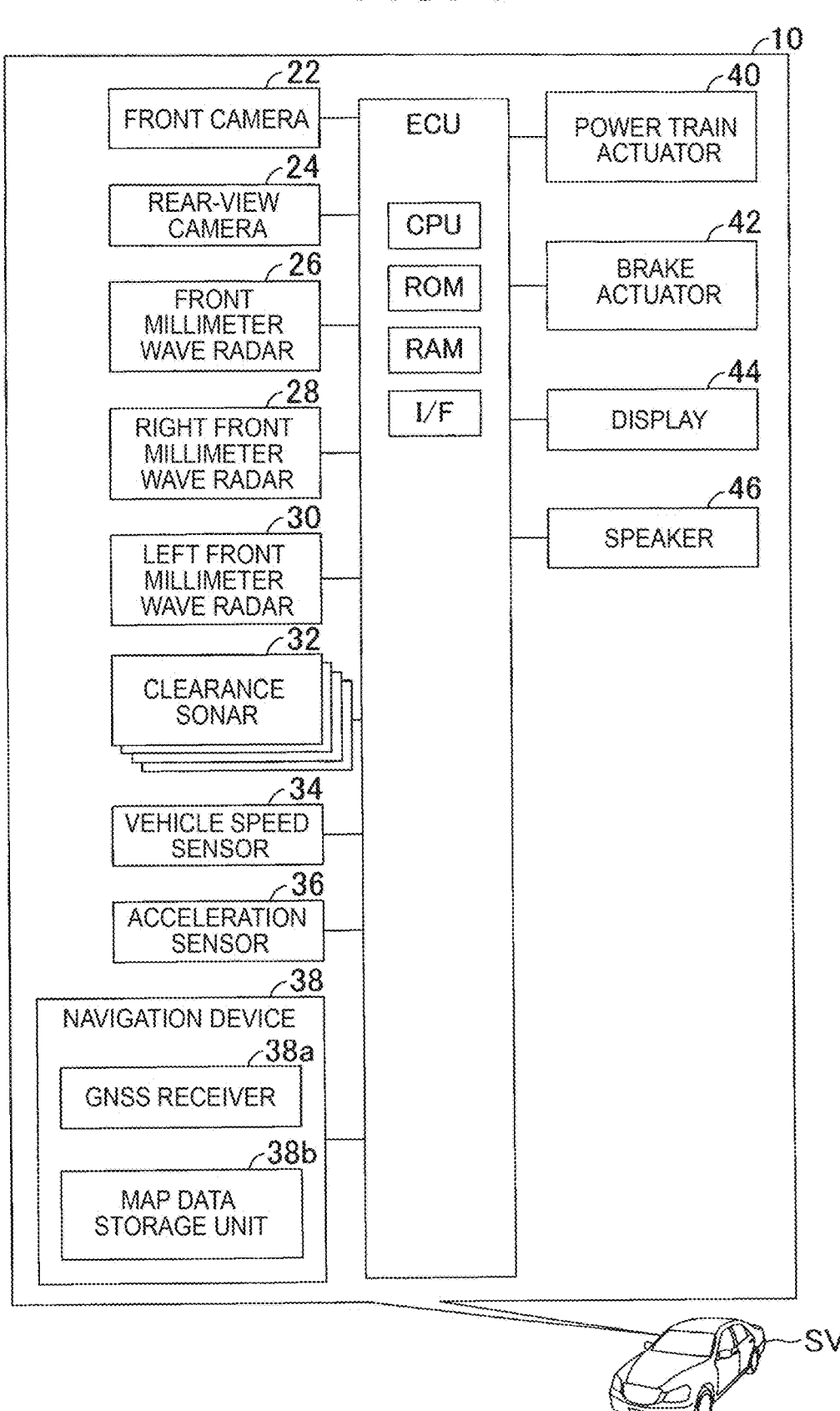
FIG. 1 is a schematic system configuration diagram of a vehicle control device according to an embodiment of the present disclosure.

As illustrated in FIG. 1, the vehicle control device 10 (hereinafter, referred to as "the device 10") according to the present embodiment is applied to the host vehicle SV and includes the components illustrated in FIG. 1.

In the present specification, "ECU 20" is an electronic control device including a microcomputer as a main part. ECU 20 are also referred to as control units, controllers, and computers. The microcomputer includes a CPU (processor), a ROM, RAM, interfaces, and the like. The function realized by ECU 20 may be realized by a plurality of ECU.

The front camera 22 captures a view in front of the host vehicle SV to acquire front image data. The rear-view camera 24 captures an image of a view behind the host vehicle SV. ECU 20 acquires front image data and rear image data from the front camera 22 and the rear-view camera 24, respectively.

The front millimeter-wave radar 26 specifies the position and the relative-velocity Vr of the object located in the front center of the host vehicle SV. The right front millimeter-wave radar 28 specifies the position and the relative-velocity Vr of the object located in the right front of the host vehicle SV. The left front millimeter-wave radar 30 specifies the position and the relative-velocity Vr of the object located in the left front of the host vehicle SV. When it is not necessary to distinguish the front millimeter wave radar 26, the right front millimeter wave radar 28, and the left front millimeter wave radar 30, they are referred to as "millimeter wave radar".

The millimeter wave radar transmits a millimeter wave, and the transmitted millimeter wave receives the reflected wave reflected by the object, thereby specifying "reflection intensity S of the reflected wave", "position of the object with respect to the host vehicle SV", and "relative velocity Vr of the object with respect to the host vehicle SV". ECU 20 obtains radar object information from the millimeter-wave radar, the radar object information including the reflection intensity S, the position of the object, and the relative-velocity Vr.

The clearance sonar 32 determines the position of the object with respect to the host vehicle SV by transmitting the ultrasonic waves and receiving the reflected waves reflected by the object. ECU 20 obtains from the clearance sonar 32 sonar object information including the position of the object. Note that a plurality of clearance sonars 32 are disposed on the host vehicle SV, and ECU 20 can identify an object located in the vicinity of the host vehicle SV.

The vehicle speed sensor 34 measures a vehicle speed Vs representing the speed of the host vehicle SV. The acceleration sensor 36 measures an acceleration G in the front-rear axial direction of the host vehicle SV. ECU 20 obtains measurements of these sensors.

The navigational device 38 includes a GNSS receiver 38a and a map data storage unit 38b. GNSS receiver 38a receives signals from a plurality of satellites and identifies the present position (latitude and longitude) of the host vehicle SV based on the received signals. The map data storage unit 38b stores map data. The position of the restricted section RS (see FIG. 2) in which the traffic of the vehicles is restricted is registered in the map data.

The powertrain actuator 40 changes a driving force generated by a driving device (for example, an internal combustion engine and/or an electric motor) of the host vehicle SV. The brake actuator 42 controls a braking force applied to the host vehicle SV.

The display 44 is disposed at a position visible to the driver in the vehicle cabin of the host vehicle SV, and displays a warning window to be described later. The speaker 46 is disposed in the vehicle cabin of the host vehicle SV, and emits an alarm sound to be described later.

Overview of Operation

ECU 20 perceives an object that meets a perception condition to be described later, and determines whether or not a relation between the host vehicle SV and the perceived object meets a predetermined collision condition. The collision condition is satisfied when the collision risk between the host vehicle SV and the object becomes equal to or greater than a predetermined value.

When the collision condition is satisfied, ECU 20 performs either or both of the following operations: giving a warning to notify an occupant (in particular, a driver) of the host vehicle SV of the risk of collision with the object, and performing vehicle control for controlling the traveling state of the host vehicle SV in order to reduce the collision risk with the object. Examples of the vehicle control include a deceleration control for decelerating the host vehicle SV, and an avoidance control for changing the steering angle of the host vehicle SV so as to avoid colliding with an object. In the present embodiment, an example in which the deceleration control is performed as the vehicle control will be described.

In the present embodiment, when a predetermined specific condition is satisfied, ECU 20 perceives the object using the relaxation perception condition that is more likely to be satisfied than when the specific condition is not satisfied. The specific condition includes at least a condition that the restricted section RS exists in the adjacent lane NL in front of the host vehicle SV. When the specific condition is satisfied, the "possibility of interruption that the adjacent vehicle NV traveling in the adjacent lane NL due to the restricted section RS interrupts the front of the host vehicle SV from the rear side of the host vehicle SV" is higher than when the specific condition is not satisfied. The adjacent lane NL is a lane adjacent to the own lane SL on which the host vehicle SV is traveling. Details of the specific conditions will be described later.

When the object is perceived using the relaxation perception condition, the perception time required for the object to be perceived is shortened. Therefore, it is possible to shorten the time until the interruption vehicle is perceived, and it is possible to reduce the possibility that the warning and the execution timing at which the vehicle should be executed have already been exceeded when the interruption vehicle is perceived. Therefore, it is possible to increase the possibility that the warning or the vehicle control for the interrupting vehicle can be executed at an appropriate timing.

Specific Conditions

Figure 2:
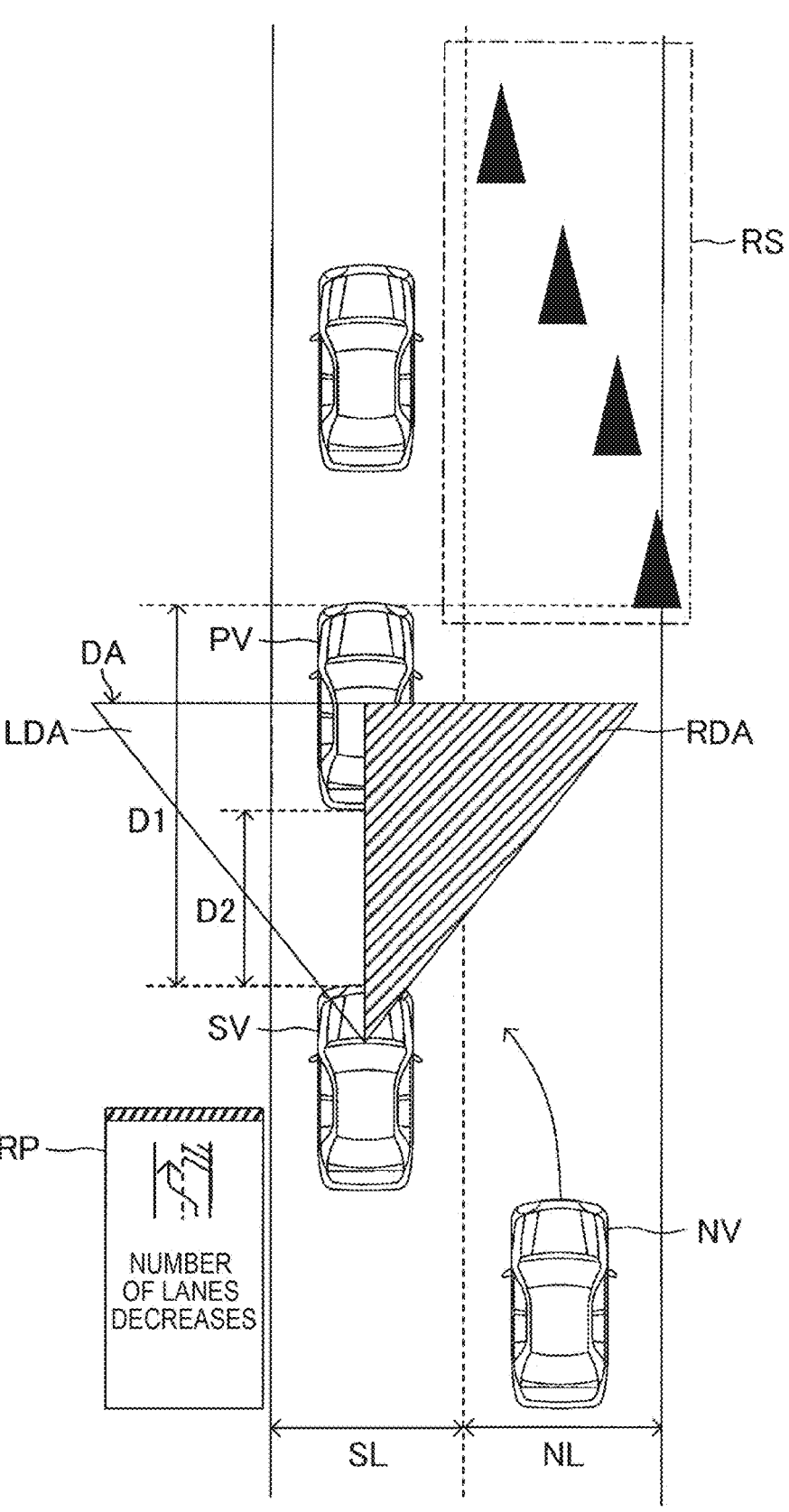
FIG. 2 is an explanatory diagram of an outline of operation of a vehicle control device according to an embodiment of the present disclosure.

Specific conditions will be described with reference to FIG. 2.

When the following condition S1 or condition S3 are satisfied, the specific condition is satisfied.

Condition S1: In the adjacent lane NL in front of the host vehicle SV, a restricted section RS exists, and a distance D1 between a starting point of the restricted section RS and the host vehicle SV is equal to or less than a first threshold distance D1th.

Condition S2: The adjacent vehicle NV is located behind the host vehicle SV, and the adjacent vehicle NV approaches the host vehicle SV.

Condition S3: The host vehicle SV in front of the own lane SL has no preceding vehicle PV, or the inter-vehicle distance D2 between the preceding vehicle PV and the host vehicle SV is equal to or greater than the second threshold distance D2th.

When the condition S1 or the condition S3 is satisfied, the traffic of the adjacent vehicle NV is restricted by the restricted section RS, so that the possibility that the adjacent vehicle NV interrupts the own lane SL ahead of the host vehicle SV is increased.

Normal Perception Conditions

If the specific condition is not satisfied, ECU 20 determines that the object satisfies the perception condition and perceives the object when the object satisfies all of the following condition N1 or condition N3.

Condition N1: An object is detected based on the forward image data and the object is detected based on the radar object information.

Condition N2: The detection time T at which the object is detected based on the forward image data is equal to or greater than the first threshold time Td1.

Condition N3: The reflection intensity S of the object is greater than or equal to the first threshold intensity Sd1.

The perception condition used when the specific condition is not satisfied is referred to as a "normal perception condition".

A "configuration for detecting an object based on forward image data" of ECU 20 may be referred to as a "first detection unit", and a "configuration for detecting an object based on radar object information" of ECU 20 may be referred to as a "second detection unit".

Relaxation Perception Conditions

On the other hand, when the specific condition is satisfied, when the object satisfies any one of the following condition N4 or condition N6, ECU 20 determines that the object satisfies the perception condition and perceives the object.

Condition N4: An object is detected based on the forward image data, and the detection time T is equal to or greater than a "second threshold time Td2 shorter than the first threshold time Td1".

Condition N5: An object is detected based on the radar object information, and the reflection intensity S is equal to or greater than a "second threshold intensity Sd2 smaller than the first threshold intensity Sd1".

Condition N6: An object is detected based on the sonar object data.

This perception condition used when the specific condition is satisfied is referred to as a "relaxation perception condition".

A "configuration for detecting an object based on the sonar object information" of ECU 20 may be referred to as a "third detection unit".

When the specific condition is not satisfied, ECU 20 perceives an object existing in the detection area DA using the normal perception condition. The detection area DA includes a right detection area RDA and a left detection area LDA. When the specific condition is satisfied, ECU 20 perceives, using the relaxation perception condition, an object existing in the area where the restricted section RS is present among the right detection area RDA and the left detection area LDA. Then, ECU 20 perceives an object existing in the area where the restricted section TS does not exist using the normal perception condition. Accordingly, it is possible to increase a possibility that a warning or a vehicle control related to the interrupting vehicle can be executed at an appropriate timing. Further, it is possible to reduce the possibility of erroneously performing the warning and the vehicle control due to erroneously perceiving an object that does not exist in the area where the adjacent vehicle NV does not exist.

Specific Operation

Vehicle Control Routine

Figure 3:
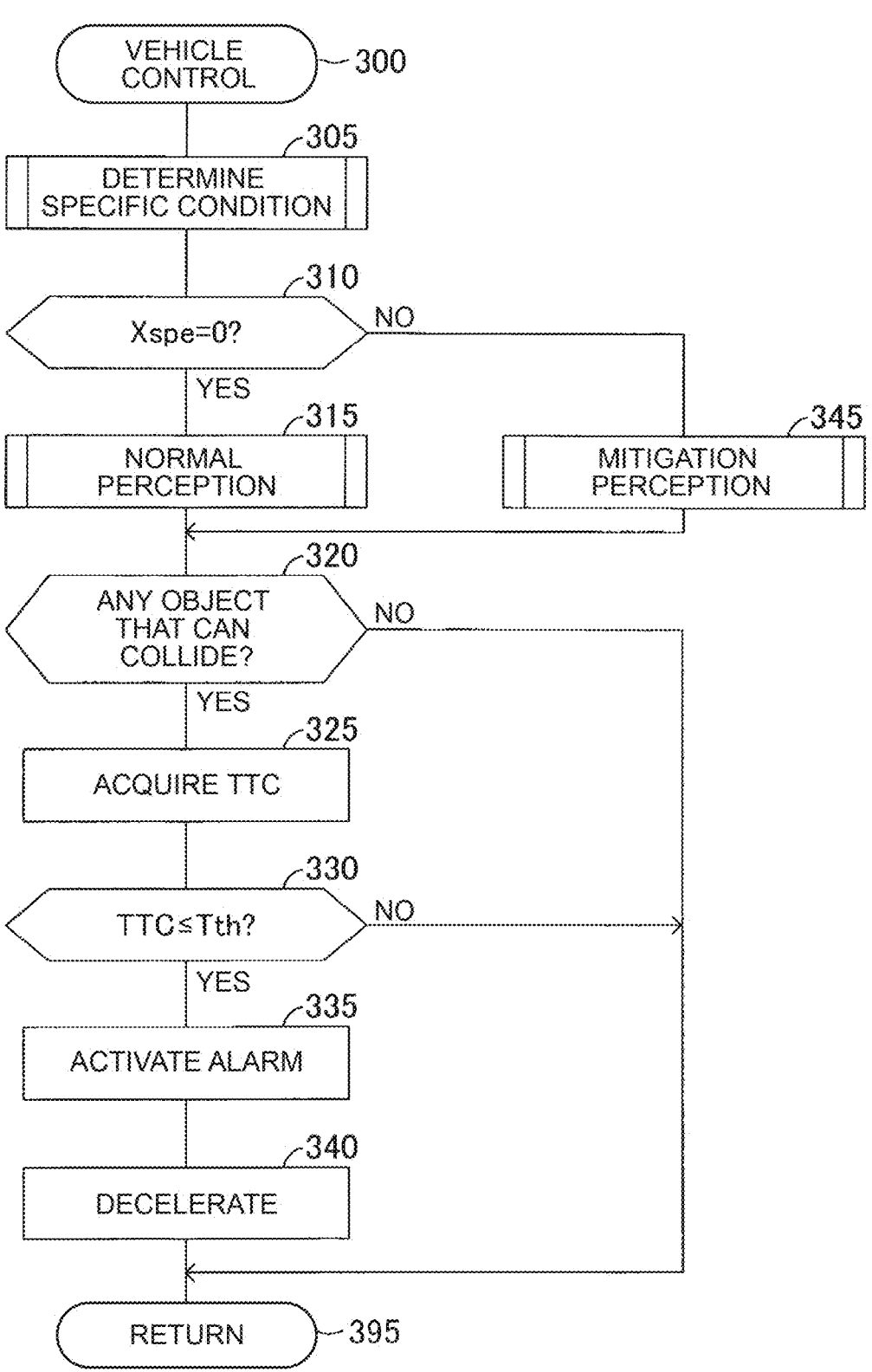
FIG. 3 is a flow chart of a vehicle control routine executed by CPU of ECU shown in FIG. 1.

CPU of ECU 20 is executed every time a predetermined period elapses in the routine illustrated by the flow chart in FIG. 3.

When the appropriate time point has arrived, CPU starts the process from step 300 of FIG. 3 and performs step 305 and step 310.

The step 305: CPU executes a specific condition determination subroutine for determining whether or not the specific condition is satisfied. Details of the specific condition determination subroutine will be described later.

The step 310: CPU determines whether or not the particular flag Xspe is "0".

The specific flag Xspe is set to "1" when the specific condition is satisfied, and is set to "0" when the specific condition is not satisfied. The specified flag Xspe is set to "0" in the initial routine. The initialization routine is executed by CPU when the ignition-key switch (not shown) of the host vehicle SV is changed from the off-position to the on-position.

If the specified flag Xspe is "0", CPU determines "Yes" in step 310 and executes step 315 and step 320.

The step-by-step 315: CPU executes a normal perception sub-routine for perceiving the object using the normal perception condition. The details of the normal perception subroutine will be described later.

The stepping 320: CPU determines whether or not there is an "object having a collision possibility that collides with the host vehicle SV" in the perceived object. Specifically, CPU estimates the moving direction of the object with respect to the host vehicle SV based on the history of the position of the object with respect to the host vehicle SV, and determines that the object has a collision possibility when the moving direction of the object intersects with the host vehicle SV.

If there are no objects that are likely to collide, CPU determines "No" at step 320. After that, the process proceeds to step 395, and CPU ends the routine once.

On the other hand, if there is an object having a collision possibility, CPU determines "Yes" in step 320, and executes step 325 and step 330.

The stepping 325: CPU obtains TTC (Time To Collision) of the object with collisional possibilities. TTC represents the period of time it takes for an object to collide with the host vehicle SV. CPU obtains TTC by dividing the distance between the object and the host vehicle SV by the relative-velocity Vr of the object. TTC is a collision index correlated with the collision risk, and the shorter TTC, the higher the collision risk. As such a collision index, the distance between the object and the host vehicle SV may be used instead of TTC.

The step 330: CPU determines whether TTC is less than or equal to a predetermined threshold time Tth.

If TTC is greater than the threshold time Tth, CPU determines that the impact risk is less than the threshold. CPU then determines "No" in step 330. After that, the process proceeds to step 395, and CPU ends the routine once.

On the other hand, if TTC is less than or equal to the threshold time Tth, CPU determines that the collision-risk is greater than or equal to the threshold. CPU then determines "Yes" in step 330 and performs steps 335 and 340.

The stepping 335: CPU provides an alert to notify the occupant of the host vehicle SV of the risk of collision with the object. Specifically, CPU causes the display 44 to display an alert window. The warning screen is a screen indicating the orientation of an object whose TTC is less than or equal to the threshold time Tth. Further, CPU emits an alert sound from the speaker 46.

The stepping 340: CPU controls the powertrain actuator 40 and the brake actuator 42 so that the acceleration G of the host vehicle SV coincides with a predetermined deceleration.

After that, the process proceeds to step 395, and CPU ends the routine once.

If the specified flag Xspe is "1" when the process proceeds to step 310, CPU determines "No" in step 310, and the process proceeds to step 345. At step 345, CPU executes a relaxation perception subroutine to perceive the object using the relaxation perception condition. Details of the relaxation perception subroutine will be described later. After that, the process proceeds to step 395, and CPU ends the routine once.

Specific Condition Determination Subroutine

Figure 4:
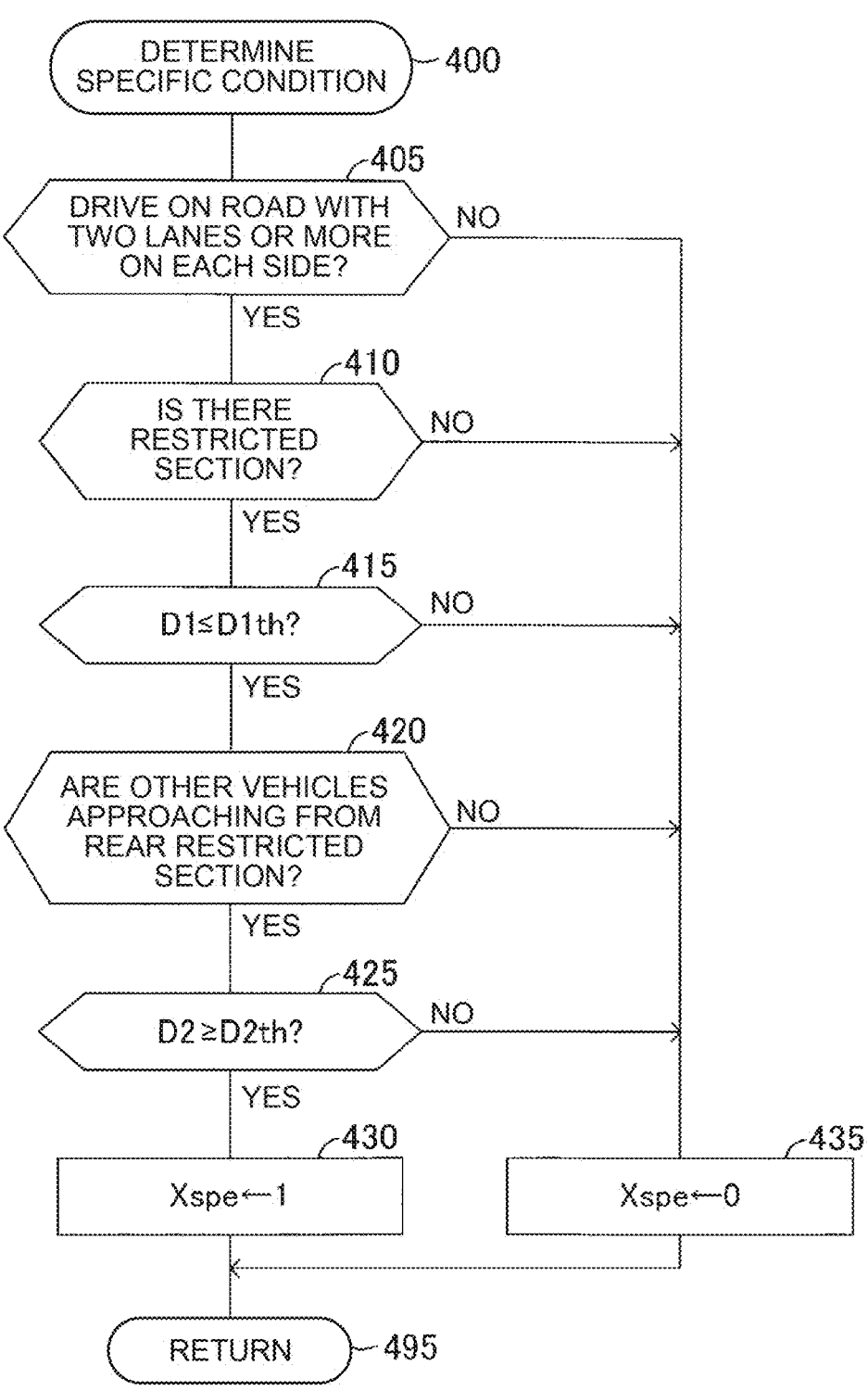
FIG. 4 is a flow chart of a specific condition determination subroutine executed by CPU of ECU shown in FIG. 1.

When the process proceeds to step 305, CPU starts the process from step 400 shown in FIG. 4, and the process proceeds to step 405. In step 405, CPU determines whether or not the host vehicle SV is traveling on a road of two lanes or more on one side. For example, when CPU determines that the adjacent lane NL is present and the traveling direction of the adjacent vehicle NV traveling in the adjacent lane NL is the same direction as the host vehicle SV, it determines that the host vehicle SV is traveling on a road having two or more lanes on one side.

If the host vehicle SV is traveling on a road of two lanes or more on one side, CPU determines "Yes" in step 405, and the process proceeds to step 410. In step 410, CPU determines whether or not the restricted section RS exists in the adjacent lane NL in the traveling direction of the host vehicle SV. For example, CPU determines whether or not the restricted section RS exists in the adjacent lane NL. As another example, CPU may determine that the restricted section RS exists in the adjacent lane NL when a road surface marking RP (see FIG. 2), a sign, a signboard, or the like indicating that restricted section RS exists in advance is detected based on the forward image data.

If there is a restricted section RS in the adjacent lane NL, CPU determines "Yes" in step 410, and the process proceeds to step 415. In step 415, CPU determines whether the distance D1 is less than or equal to the first threshold distance D1th. In one embodiment, CPU obtains the distance D1 based on the map data.

When the distance D1 is equal to or smaller than the first threshold distance D1th, the condition S1 is satisfied. In this instance, CPU determines "Yes" in step 415, and the process proceeds to step 420. In step 420, CPU determines whether or not the adjacent vehicle NV is approaching from the rear of the host vehicle SV where the restricted section RS exists, based on the radar object data from the right rear millimeter wave radar and the left rear millimeter wave radar, which are not illustrated.

When the adjacent vehicle NV is approaching from the rear of the host vehicle SV where the restricted section RS exists, the above-described condition S2 is satisfied. In this instance, CPU determines "Yes" in step 420, and the process proceeds to step 425. In step 425, CPU determines whether the distance D2 is greater than or equal to the second threshold distance D2th. As an illustration, CPU obtains the distance D2 based on the front camera images and the radar object data from the front millimeter wave radar 26.

When the preceding vehicle PV does not exist or the distance D2 is equal to or larger than the second threshold distance D2th, the condition S3 is satisfied. In this case, all of the condition S1 to the condition S3 are satisfied, and the specific condition is satisfied. In this instance, CPU determines "Yes" in step 425, and the process proceeds to step 430. In step 430, CPU sets the specified flag Xspe to "1". After that, the process proceeds to step 495, and CPU ends the routine once.

In the following case, since the specific condition is not satisfied, the processing proceeds to step 435. In step 435, CPU sets the specified flag Xspe to "0". After that, the process proceeds to step 495, and CPU ends the routine once.

When the host vehicle SV is not traveling on a road of two lanes or more on one side ("No" in Step 405)

When there is no restricted section RS in the adjacent lane NL ("No" in step 410)

When the above distance D1 is longer than the first threshold distance D1th ("No" in step 415)

If there is no adjacent vehicle NV behind the host vehicle SV on the side where the restricted section RS exists ("No" in step 420), and if the adjacent vehicle NV does not approach behind the host vehicle SV on the side where the restricted section RS exists ("No" in step 420)

When the above distance D2 is less than the second threshold distance D2th ("No" in step 425)

When the distance D2 is less than the second threshold distance D2th, the distance between the preceding vehicle PV and the host vehicle SV is short, and therefore, it is unlikely that the adjacent vehicle NV will be interrupted in front of the host vehicle SV, so that the specific condition is not satisfied.

Normal Perception Subroutine

Figure 5:
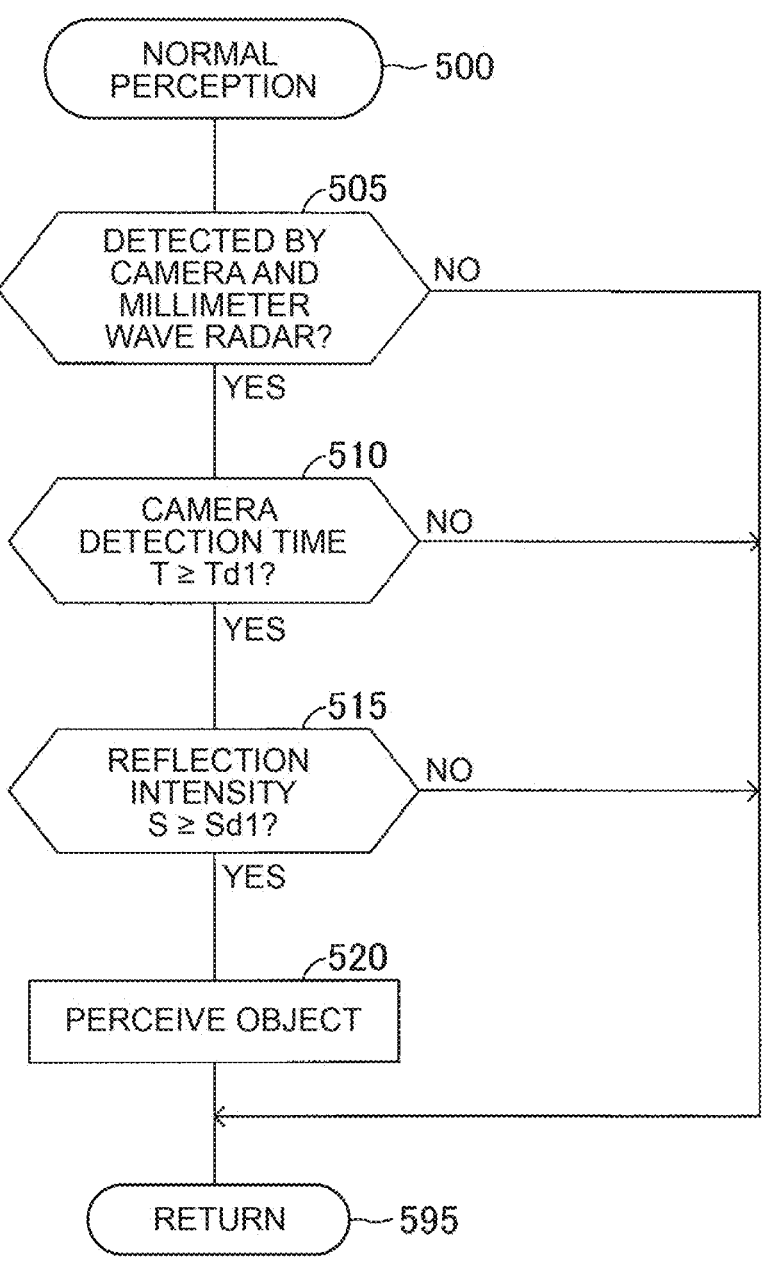
FIG. 5 is a flow chart of a normal perception subroutine performed by CPU of ECU shown in FIG. 1.

When the process proceeds to step 315, CPU starts the process from step 500 shown in FIG. 5, and the process proceeds to step 505. In step 505, CPU detects the object in the front-camera images and determines whether the object has been detected based on the radar object data. Specifically, when the difference between the position of the object detected based on the front camera image and the position of the object detected based on the radar object information is equal to or smaller than a predetermined value, CPU determines that these objects are the same object.

When an object is detected in the front-camera image and the object is detected based on the radar object information, the condition N1 is satisfied. In this instance, CPU determines "Yes" in step 505, and the process proceeds to step 510. In step 510, CPU determines whether the detection time T of the object is greater than or equal to the first threshold time Td1.

When the detection time T is equal to or greater than the first threshold time Td1, the condition N2 is satisfied. In this instance, CPU determines "Yes" in step 510, and the process proceeds to step 515. In step 515, CPU determines, based on the radar object data, whether the reflection intensity S of the object is greater than or equal to the first threshold intensity Sd1.

When the reflection intensity S is equal to or greater than the first threshold intensity Sd1, the condition N3 is satisfied, and the object satisfies the normal perception condition. In this instance, CPU determines "Yes" in step 515 and perceives the object. After that, the process proceeds to step 595, and CPU ends the routine once.

In the following cases, since the object does not satisfy the normal perception condition, CPU does not perceive the object, the process proceeds to step 595, and CPU ends the routine once.

When an object is not detected in at least one of the front camera image and the radar object information ("No" in step 505).

If the detection time T is less than the 1 threshold time Td1 ("No" in step 510)

When the reflection intensity S is less than the 1 threshold intensity Sd1 ("No" in step 515)

Mitigation Perception Subroutine

Figure 6:
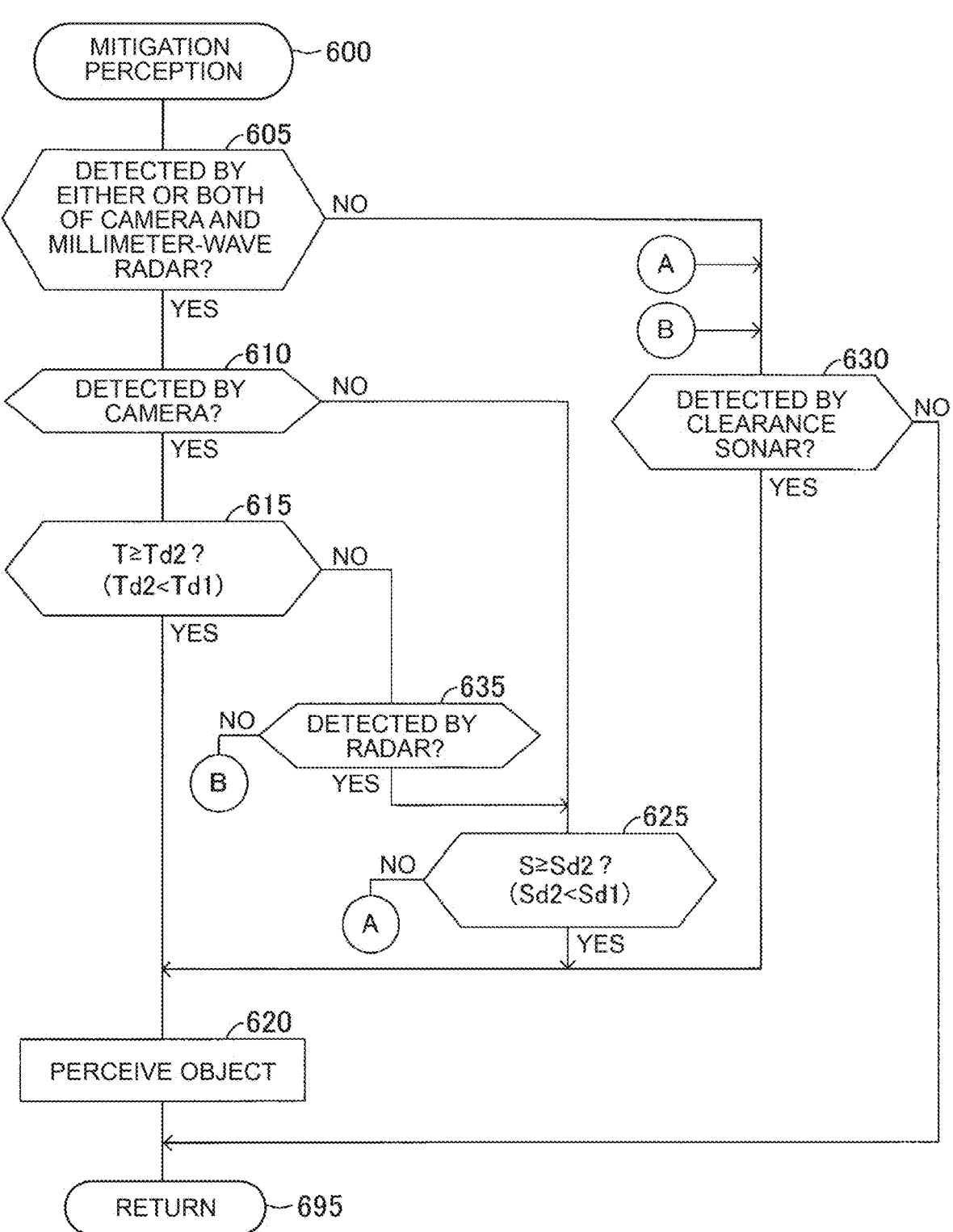
FIG. 6 is a flow chart of a mitigation perception subroutine performed by CPU of ECU shown in FIG. 1.

When the process proceeds to step 345, CPU starts the process from step 600 shown in FIG. 6, and the process proceeds to step 605. In step 605, CPU determines whether an object has been detected based on at least one of the forward camera images and radar object data.

If an object is detected based on at least one of the front camera image and the radar object information, CPU determines "Yes" in step 605, and the process proceeds to step 610. In step 610, CPU determines whether an object has been detected based on the front-camera images.

If an object is detected based on the front-camera images, CPU determines "Yes" in step 610 and the process proceeds to step 615. In step 615, CPU determines whether the detection time T of the detected object is greater than or equal to the second threshold time Td2 based on the forward camera-image.

When the detection time T is equal to or greater than the second threshold time Td2, the condition N4 is satisfied, and the relaxation perception condition is satisfied. In this instance, CPU determines "Yes" in step 615, and the process proceeds to step 620. At step 620, CPU perceives the object. After that, the process proceeds to step 695, and CPU ends the routine once.

If no object is detected based on the front camera-image, CPU determines "No" at step 610 and the process proceeds to step 625. In step 625, CPU determines whether the reflection intensity S is greater than or equal to the second threshold intensity Sd2.

When the reflection intensity S is equal to or greater than the second threshold intensity Sd2, the condition N5 is satisfied, and the relaxation perception condition is satisfied. CPU then determines "Yes" in step 625 and perceives the object in step 620. After that, the process proceeds to step 695, and CPU ends the routine once.

If the reflection intensity S is less than the second threshold intensity Sd2, CPU determines "No" in step 625, and the process proceeds to step 630. In step 630, CPU determines whether the clearance sonar 32 has detected an object.

When an object is detected by the clearance sonar 32, the above-described condition N6 is satisfied and the relaxation perception condition is satisfied. CPU then determines "Yes" in step 630 and perceives the object in step 620. After that, the process proceeds to step 695, and CPU ends the routine once.

On the other hand, when no object is detected by the clearance sonar 32, the relaxation perception condition is not satisfied. If CPU does not perceive the object, the process proceeds to step 695, and CPU ends the routine once.

If the detection time T is less than the second threshold time Td2 when the process proceeds to step 615, CPU determines "No" in step 615, and the process proceeds to step 635. In step 635, CPU determines whether an object has been detected based on the radar object data.

If an object is detected based on the radar object data, CPU determines "Yes" in step 635, and the process proceeds to step 625. On the other hand, if no object is detected based on the radar object data, CPU determines "No" in step 635, and the process proceeds to step 630.

As described above, according to the present embodiment, since the object is perceived using the relaxation perception condition when the specific condition is satisfied, it is possible to increase the possibility that the warning or the vehicle control related to the interrupting vehicle can be executed at an appropriate timing.

Instead of the millimeter wave radar, the device 10 may include a radar that transmits an electromagnetic wave and detects an object by receiving a reflected wave reflected by the object.

The device 10 need only perform either or both of giving a warning and performing vehicle control.

In step 410 illustrated in FIG. 4, when there is a restricted section RS that satisfies the following condition in front of the host vehicle SV in the adjacent lane NL, CPU may determine "Yes" in step 410.

Condition: The elapsed time after the restricted section RS is provided is less than a certain period.

It is assumed that the elapsed period is stored in the map data.

Many drivers are likely not to know the presence of a restricted section RS that has not elapsed days since being provided. For this reason, in a road in which such a restricted section RS is present, there is a high possibility that the number of interrupting vehicles interrupting in front of the host vehicle SV increases. Since the specific condition is established only when the possibility of interruption is high, the possibility that the warning and/or the vehicle control is erroneously executed due to the erroneous perception of the object can be reduced.

The first detection unit, the second detection unit, and the third detection unit have been described as ECU 20 configurations, but may be configurations of the front camera 22, the millimeter wave radar, and the clearance sonar 32, respectively.

The device 10 is applicable to vehicles such as engine vehicles, hybrid electric vehicle, plug-in hybrid electric vehicles, fuel cell electric vehicle, and battery electric vehicle. Furthermore, the present disclosure can be regarded as a non-transitory storage medium in which a program for realizing the functions of the device 10 is stored and which is readable by a computer.

What is claimed is:

1. A vehicle control device, comprising:
   a first transmitter configured to transmit an electromagnetic wave forward of a host vehicle;
   a second transmitter configured to transmit a sound wave to around the host vehicle; and
   one or more processors configured to:
   detect an object based on a reflected electromagnetic wave reflected by the object;
   detect the object based on a reflected sound wave reflected by the object; and
   detect the object as a detected object based on image data acquired by capturing a view in front of the host vehicle, wherein:
   the one or more processors are further configured to, when the object located in front of the host vehicle meets a predetermined perception condition, detect the object, and when a relationship between the host vehicle and the detected object meets a predetermined collision condition, perform either or both of following operations:

giving a warning to notify an occupant of the host vehicle of a risk of collision with the detected object; and performing vehicle control for controlling a traveling state of the host vehicle in order to reduce the risk of collision;

the one or more processors are further configured to, when a specific condition is satisfied, make the predetermined perception condition easier to be satisfied than when the specific condition is not satisfied;

the specific condition includes a condition that a restricted section where traffic is restricted is present in front of the host vehicle in an adjacent lane located adjacent to an own lane in which the host vehicle travels;

the specific condition is satisfied when all of the following conditions are satisfied:

a condition that a distance between the host vehicle and a start point of the restricted section is equal to or less than a first threshold distance;

a condition that an adjacent vehicle located behind the host vehicle in the adjacent lane in which the restricted section is present approaches the host vehicle; and a condition that there is no preceding vehicle in front of the host vehicle in the own lane or a distance between a preceding vehicle and the host vehicle is equal to or larger than a second threshold distance;

when the specific condition is not satisfied, the vehicle control device determines that the object meets the predetermined perception condition when both of following conditions are satisfied:

a condition that, based on the reflected electromagnetic wave, the one or more processors detect the object and, based on the reflected sound wave, the one or more processors detect the same object as the object detected based on the reflected electromagnetic wave; and a condition that a detection time during which the one or more processors detect the object based on the reflected electromagnetic wave is equal to or longer than a first threshold time and a reflection intensity of the reflect electromagnetic wave from the object is equal to or higher than a first threshold intensity;

when the specific condition is satisfied, the one or more processors determine that the object meets the predetermined perception condition when any one of following conditions is satisfied:

a condition that the one or more processors detect the object based on the reflected electromagnetic wave and the detection time is equal to or longer than a second threshold time that is shorter than the first threshold time;

a condition that the one or more processors detect the object based on the reflected sound wave and the reflection intensity is equal to or higher than a second threshold intensity that is lower than the first threshold intensity; and a condition that the one or more processors detect the object;

the one or more processors determine whether the predetermined perception condition is satisfied for an object located in a detection area including a right detection area on a right side of the host vehicle and a left detection area on a left side of the host vehicle; and when the specific condition is satisfied, the vehicle control device makes the predetermined perception condition easier to be satisfied than when the specific condition is not satisfied in a region where the restricted section is present out of the right detection area and the left detection area.

2. A vehicle control method, the method comprising the steps of:

detecting an object based on a reflected electromagnetic wave reflected by the object;

detecting the object based on a reflected sound wave reflected by the object;

detecting the object as a detected object based on image data acquired by capturing a view in front of a host vehicle;

detecting the object when the object located in front of the host vehicle meets a predetermined perception condition;

performing either or both of the following operations when a relationship between the host vehicle and the detected object meets a predetermined collision condition:

giving a warning to notify an occupant of the host vehicle of a risk of collision with the detected object; and performing vehicle control for controlling a traveling state of the host vehicle in order to reduce the risk of collision;

when a specific condition is satisfied, making the predetermined perception condition easier to be satisfied than when the specific condition is not satisfied, the specific condition including a condition that a restricted section where traffic is restricted is present in front of the host vehicle in an adjacent lane located adjacent to an own lane in which the host vehicle travels, the specific condition being satisfied when all of the following conditions are satisfied:

a condition that a distance between the host vehicle and a start point of the restricted section is equal to or less than a first threshold distance;

a condition that an adjacent vehicle located behind the host vehicle in the adjacent lane in which the restricted section is present approaches the host vehicle; and a condition that there is no preceding vehicle in front of the host vehicle in the own lane or a distance between a preceding vehicle and the host vehicle is equal to or larger than a second threshold distance;

when the specific condition is not satisfied, determining that the object meets the predetermined perception condition when both of following conditions are satisfied:

a condition that, the object was detected based on both the reflected electromagnetic wave and the reflected sound wave; and a condition that a detection time during which the object was detected based on the reflected electromagnetic wave is equal to or longer than a first threshold time and a reflection intensity of the reflect electromagnetic wave from the object is equal to or higher than a first threshold intensity;

when the specific condition is satisfied, determining that the object meets the predetermined perception condition when any one of following conditions is satisfied:

a condition that the object was detected based on the reflected electromagnetic wave and the detection time is equal to or longer than a second threshold time that is shorter than the first threshold time;

a condition that the object was detected based on the reflected sound wave and the reflection intensity is equal to or higher than a second threshold intensity that is lower than the first threshold intensity; and a condition that one or more processors detect the object;

determining whether the predetermined perception condition is satisfied for a second object located in a detection area including a right detection area on a right side of the host vehicle and a left detection area on a left side of the host vehicle; and when the specific condition is satisfied, making the predetermined perception condition easier to be satisfied than when the specific condition is not satisfied in a region where the restricted section is present out of the right detection area and the left detection area.

3. A non-transitory storage medium storing a program that, when executed by a computer, causes the computer to perform the steps of:

detecting an object based on a reflected electromagnetic wave reflected by the object;

detecting the object based on a reflected sound wave reflected by the object;

detecting the object as a detected object based on image data acquired by capturing a view in front of a host vehicle;

detecting the object when the object located in front of the host vehicle meets a predetermined perception condition;

performing either or both of the following operations when a relationship between the host vehicle and the detected object meets a predetermined collision condition:

giving a warning to notify an occupant of the host vehicle of a risk of collision with the detected object, and performing vehicle control for controlling a traveling state of the host vehicle in order to reduce the risk of collision;

when a specific condition is satisfied, making the predetermined perception condition easier to be satisfied than when the specific condition is not satisfied, the specific condition including a condition that a restricted section where traffic is restricted is present in front of the host vehicle in an adjacent lane located adjacent to an own lane in which the host vehicle travels, the specific condition being satisfied when all of the following conditions are satisfied:

a condition that a distance between the host vehicle and a start point of the restricted section is equal to or less than a first threshold distance;

a condition that an adjacent vehicle located behind the host vehicle in the adjacent lane in which the restricted section is present approaches the host vehicle; and a condition that there is no preceding vehicle in front of the host vehicle in the own lane or a distance between a preceding vehicle and the host vehicle is equal to or larger than a second threshold distance;

when the specific condition is not satisfied, determining that the object meets the predetermined perception condition when both of following conditions are satisfied:

a condition that, the object was detected based on both the reflected electromagnetic wave and the reflected sound wave; and a condition that a detection time during which the object was detected based on the reflected electromagnetic wave is equal to or longer than a first threshold time and a reflection intensity of the reflect electromagnetic wave from the object is equal to or higher than a first threshold intensity;

when the specific condition is satisfied, determining that the object meets the predetermined perception condition when any one of following conditions is satisfied:

a condition that the object was detected based on the reflected electromagnetic wave and the detection time is equal to or longer than a second threshold time that is shorter than the first threshold time;

a condition that the object was detected based on the reflected sound wave and the reflection intensity is equal to or higher than a second threshold intensity that is lower than the first threshold intensity; and a condition that one or more processors detect the object;

determining whether the predetermined perception condition is satisfied for a second object located in a detection area including a right detection area on a right side of the host vehicle and a left detection area on a left side of the host vehicle; and when the specific condition is satisfied, making the predetermined perception condition easier to be satisfied than when the specific condition is not satisfied in a region where the restricted section is present out of the right detection area and the left detection area.

* * * * *